United States Patent
Diehl et al.

(12)

(10) Patent No.: US 6,337,359 B1
(45) Date of Patent: Jan. 8, 2002

(54) LATEX BINDER FOR NONWOVEN FIBERS AND ARTICLE MADE THEREWITH

(75) Inventors: David F. Diehl, Akron; Carla Dittman McBain, Wadsworth, both of OH (US)

(73) Assignee: Gencorp Inc., Akron, OH (US)

( * ) Notice: Subject to any disclaimer, the term of this patent is extended or adjusted under 35 U.S.C. 154(b) by 0 days.

(21) Appl. No.: 09/368,555

(22) Filed: Aug. 5, 1999

(51) Int. Cl.$^7$ ............... C08F 2/16; C08F 8/44; C08F 257/02; C08F 265/02
(52) U.S. Cl. ............ 523/201; 524/460; 525/327.8; 525/330.2; 525/902; 526/80; 526/201
(58) Field of Search ............ 523/201; 525/902, 525/327.8, 330.2; 524/460; 526/80, 201

(56) References Cited

U.S. PATENT DOCUMENTS 4,134,872 A * 1/1979 Lee .................. 260/297.7 UP
4,413,068 A * 11/1983 Sinclair et al. ............. 523/201
4,613,633 A * 9/1986 Sekiya et al. ............... 523/201
5,114,991 A * 5/1992 Neubert ...................... 523/201

* cited by examiner

Primary Examiner—Donald R. Wilson
Assistant Examiner—Kelechi C. Egwim

(57) ABSTRACT

A latex as a binder for nonwoven applications to form a permeable sublayer of personal hygiene articles. The latex is prepared by a process including the steps of (1) polymerizing a monomer mixture comprising styrene, itaconic acid, surfactant and water soluble free radical initiator to form a seed; (2) sequentially adding equal increments of a monomer mixture of styrene, butadiene and acrylic acid to the seed under emulsion polymerization conditions to form a styrene-butadiene-acrylic acid copolymer; and then (3) neutralizing the styrene-butadiene-acrylic acid copolymer to a pH of about 4.5 to 7 to form the latex.

7 Claims, No Drawings

LATEX BINDER FOR NONWOVEN FIBERS AND ARTICLE MADE THEREWITH

FIELD OF THE INVENTION

The present invention relates to a latex binder for treating nonwoven fibers and a method of manufacture of a personal hygiene article including the latex binder. More particularly, the present invention relates to a latex binder for treating nonwoven fibers to make a nonwoven fabric that is particularly suitable for use as a permeable sublayer of a personal hygiene article.

BACKGROUND OF THE INVENTION

A nonwoven fabric is a web or continuous sheet of fibers laid down mechanically. The fibers may be deposited in a random manner or oriented in one direction. Most widely used fibers include cellulosics, polyamides, polyesters, polypropylene and polyethylene. The spun fibers, which may be drawn, are laid down directly onto a belt by carding, airlaying or wet-laying. The sheet is then bonded together with a latex binder and subsequently treated in an oven or a calendar to complete the bonding process.

Commonly used lattices for nonwoven fabrics are those prepared from polymers of butadiene-styrene, butadiene-acrylonitrile, vinyl acetate, acrylic monomers such as methyl acrylate, ethyl acrylate, methyl methacrylate and the like. It will be appreciated that to be useful as a nonwoven fabric in many applications, such as a permeable sublayer of a personal hygiene article, the latex binder should possess several desired physical properties. The desired physical properties include adequate tensile strength, a high modulus or stiffness under certain conditions, and good textile qualities such as tenacity, handle and the like.

It is an object of the present invention to provide a nonwoven fabric having a high modulus. It is another object of the present invention to provide a nonwoven fabric having desired physical properties. Yet another object of the present invention is to provide a nonwoven fabric of chemically bonded fibers that is simple and economical to manufacture.

SUMMARY OF THE INVENTION

Briefly, the present invention relates to a latex that is particularly suitable for utilization as a binder for nonwoven applications. The latex is prepared by a process including the steps of:

(1) polymerizing a monomer mixture comprising styrene, itaconic acid, surfactant and water soluble free radical initiator to form a seed;

(2) sequentially adding equal increments of a monomer mixture of styrene, butadiene and acrylic acid to the seed under emulsion polymerization conditions to form a styrene-butadiene-acrylic acid copolymer; and then (3) neutralizing the styrene-butadiene-acrylic acid copolymer to a pH of about 4.5 to 7 to form the latex.

The latex is particularly suitable to treat nonwoven fibers to form a permeable sublayer of a personal hygiene article. The permeable sublayer is typically interposed between a topsheet layer and a backsheet layer typically used to form the personal hygiene article.

DESCRIPTION OF THE PREFERRED EMBODIMENTS

The present invention relates to a latex suitable for utilization as a binder to chemically bond fibers and form a nonwoven fabric. The nonwoven fabric is particularly suitable for use as a permeable sublayer of a personal hygiene article of a type well known in the art. Examples of personal hygiene articles include diapers, feminine hygiene articles and the like.

The permeable sublayer of the personal hygiene article is a web or mat comprised of randomly arranged nonwoven fibers having an open structure and high loft. The web may be formed by carding when the fibers are of such a character, by virtue of their length and flexibility, as to be capable of carding. During carding the crimped fibers are placed on a moving support and then treated with a latex binder as described herein.

The fibers may include natural textile fibers such as jute, sisal, ramie, hemp, and cotton as well as many artificial organic textile fibers or filaments including rayon, those of cellulose esters such as cellulose acetate, vinyl resin fibers such as those of polyvinyl chloride, copolymers of vinyl chloride with vinyl acetate, vinylidene chloride or acrylonitrile, copolymers of acrylonitrile with vinyl chloride, vinyl acetate, methacrylonitrile, vinyl pyridine, polymers and copolymers of olefins such as ethylene and propylene, also condensation polymers such as polyamides or nylon types, polyesters such as ethylene glycol terephthalate polymers and the like.

The fibers may be of one composition or mixtures of fibers in a given web. The preferred fibers include polyolefins, especially polyesters, poly(ethylene terephthalate), and acrylics, polyamides, polypropylene. The polyolefin fibers include polypropylene, polyethylene, polybutene and their copolymers. The polyester fibers include any long chain synthetic polymer composed of at least 85% by weight of an ester of a dihydric alcohol and terephthalic acid such as polyethylene terephthalate, and, in addition liquid crystal polyesters, thermotropic polyesters and the like. The acrylic fibers include any fiber forming substance containing a long chain synthetic polymer composed of at least 85% by weight acrylonitrile units —$CH_2CH(CN)$—. It will be appreciated that other types of fibers may also be employed in accordance with the teachings of the present invention. For example, high modulus fibers more commonly known as graphite fibers made from rayon, polyacrylonitrile or petroleum pitch may also be used.

The fibers may be of most any suitable size and randomly arranged to most any suitable thickness depending upon the desired end use of the nonwoven fabric. The fibers are typically of a length of about 0.25 to 2 inches and typically about 1.2–15 denier. The fibers may be laid in an overlapping, intersecting random arrangement to a thickness of about 0.25 inches or less to form a mat of fibers. The fibers may be arranged by most any convenient known manner such as by wet laying, air-laying or carding.

The fabric of the present invention is made by forming a mat of randomly arranged fibers. After the fibers are randomly arranged as desired, a latex binder is applied to the fibers. The latex binder is applied in an effective amount which will result in the fabric having sufficient strength and cohesiveness for the intended end use application. As well known in the art, the latex binder may be applied to the layer of randomly arranged fibers in a spaced, intermittent pattern of binder sites, or uniformly applied throughout the layer of fibers. It will be further appreciated that the exact amount of the latex binder employed depends, in part, upon factors such as the type of fiber, weight of fibrous layer, nature of latex binder and the like. For example, end uses which require a stronger fabric may utilize more binder. A typical content of latex binder applied on a fiber mat is about 15–40 wt %. It is preferred that the minimum amount of latex binder be applied to obtain the desired required physical properties of the nonwoven fabric such as tensile, hand and the like as well known in the art.

The latex is then cured using methods well known in the art such as by application of heat or radiation. The term "cured" refers to the latex being cross-linked to increase the tensile strength properties. The curing of the treated fibers is affected at a temperature above the glass transition temperature of the binder.

To obtain a sufficient thickness for the end use intended a plurality of webs may also be superimposed upon one another to achieve a sufficient thickness. The webs may be superimposed by alternating layers of carded webs disposed with their fiber orientation directions disposed at angles such as 60 degrees or 90 degrees with respect to intervening layers.

The latex binder utilized in accordance with the present invention may be prepared by well-known conventional emulsion polymerization techniques using one or more ethylenically unsaturated monomers and a polymeric surfactant as herein disclosed and additional conventional additives such as free-radical initiators, optional chain transfer agents, chelating agents and the like can be utilized as set forth in U.S. Pat. No. 5,166,259 to Schmeing and White.

In accordance with a preferred embodiment of the present invention, the latex is prepared by polymerizing a monomer mixture comprising styrene, itaconic acid, surfactant and a water soluble free radical initiator to form a seed. A monomer mixture is then added incrementally to the seed under emulsion polymerization conditions. The monomer mixture includes styrene, butadiene, and acrylic acid. The monomer mixture is preferably added incrementally to the seed to form a styrene-butadiene-acrylic acid copolymer. In the preferred embodiment, the monomer mixture includes about 34–70 wt % styrene of the total composition. The monomer mixture also includes about 0.5–2.5 wt % itaconic acid, preferably 2 wt % itaconic acid of the total composition, about 20–55 wt % butadiene and acrylic acid in an amount of about 6–10 wt %, preferably 8 wt %.

A surfactant is added to the monomer mixture in an amount of about 0.05–2.0 wt %. The surfactant may be most any suitable emulsifier, soap, or the like well known in the art and suitable at the pH of the latex in accordance with the present invention. Examples of suitable emulsifiers and surfactants include alkyl sulfates, alkyl sulfosuccinates, alkyl aryl sulfonates, alpha-olefin sulfonates, fatty or rosin acid salts, only or octyl phenol reaction products of ethylene oxide and the like. Other surfactants that may be used include those identified in Surface Active Agents, Schwartz and Berry, Vol. 1, Interscience Publishers, Inc., New York, 1958; Surface Activity, Moilet, Collie and Black, D. Van Nostrand Company, Inc., New York, 1961; Organic Chemistry, Feiser and Feiser, D.C. Heath and Company, Boston, 1944; and The Merck Index, Seventh Edition, Merck & Co., Inc., Rahway, N.J., 1960, all of which are hereby incorporated by reference.

The copolymer is then neutralized to a pH of about 4.5 to 7.0 to form the latex. The pH of the latex is neutralized by addition of a base. Examples of a suitable base include potassium hydroxide, sodium bicarbonate, ammonium hydroxide, sodium hydroxide and the like. The amount of base added to the latex is adjusted to obtain the desired pH range as is well known in the art.

Polymerization is typically carried out from about 150 degrees Fahrenheit to 170 degrees Fahrenheit. Polymerization is generally conducted for about 4 to 24 hours, however polymerization conditions may vary as desired to provide different conversion levels of monomer to copolymer. The monomer mixture is allowed to react until substantially constant solids at which time at least 99% of the monomers have been converted.

The invention will be further clarified by a consideration of the following example, which is intended to be purely exemplary of the invention.

EXAMPLE

Initially, a charge of deionized water, styrene and itaconic acid, and water soluble free radical initiator were added to a reactor having a volume of about 20 gallons and having a capacity to hold about 140 lb. of latex. The reactor was then evacuated with a vacuum (about 20 inches of mercury), purged with nitrogen and heated to a desired temperature. Ammonium persulfate was then added to the reactor as about a 10% solution in deionized water.

A charge comprising styrene, butadiene and acrylic acid was then charged to the reactor sequentially.

The first increment was added to the reactor approximately 5 minutes after the ammonium persulfate was added. Additional increments were then added to the reactor at staged intervals of about 15 or 20 minutes. The increments may be added over most any suitable number of staged intervals depending upon the amount of latex binder to be polymerized. For example, the increments may be added from 6 stages up to 12 or more stages. After the last increment was added to the reactor the reaction was monitored until the solid level of the latex in the reactor indicated an acceptable conversion level.

The resulting latex binder was then applied to polyester fibers. After applying the latex binder to the nonwoven fibers the latex binder was oven dried at 212 degrees Fahrenheit to bond the fibers and then cured at 300 degrees Fahrenheit for 1 minute to form a dimensionally stable nonwoven fabric.

Representative physical properties of the styrene-butadiene latex binder are shown in Table 1. As shown in Table 1, the fibers had a higher hand value and higher dry tensile properties as compared to polyester fibers treated with GenFlo 3060. GenFlo 3060 is a styrene butadiene rubber latex commercially available from GenCorp Inc.

TABLE 1

|  | GenFlo 3060 | Latex |
| --- | --- | --- |
| Latex content (%) | 39.5 | 39.9 |
| Yellow Index | −7.6 | −7.7 |
| Hand Value | 44.3 | 68.8 |
| Cross Direction, dry |  |  |
| Tensile (grams) | 323 | 503 |
| Elongation (%) | 27 | 17 |
| TEA | 199 | 206 |
| Cross Direction, wet |  |  |
| Tensile (grams) | 162 | 141 |
| Elongation (%) | 39 | 4 |
| TEA | 79 | 10 |

All of the reported performance properties were determined after conditioning the fibers for about 24 hours at TAppI (Technical Association of the pulp and paper Industry) Standard Conditions of approximately 72 degrees Fahrenheit and about 50% relative humidity. The tensile values, both dry and wet, were determined in accordance with ASTM D 1117-80 entitled "Standard Methods of Testing Nonwoven Fabrics" published in the 1980 Annual Book of ASTM Standards. Following the ASTM standard test method, dry tensile measurements were determined by using 1 inch wide and 4 inch long strips of fabric pulled at a rate of 5 inches per minute at an initial jaw separation of about 3 inches on an Instron. The wet tensile measurements were determined in substantially the same manner as the dry tensile measurements except the fabric strip was soaked in water solution for about 30 seconds prior to testing on the Instron. The Hand Values are a quantitative measure of the fabric as well known in the textile industry. The Hand Values reported are an average value of the readings determined on a Thwing Albert Handle-O-Meter by using a 5 inch square piece of the fabric. The fabric was tested on the Handle-O-Meter in both the Machine and Cross machine directions.

The patents and documents referred to herein are hereby incorporated by reference.

Having described presently preferred embodiments of the present invention, it is to be understood that it may be otherwise embodied within the scope of the appended claims.

What is claimed:

1. A latex which is particularly beneficial for utilization as a binder for nonwoven applications made by the process which comprises the steps of:

(1) polymerizing a seed monomer mixture comprising styrene, itaconic acid, surfactant and water soluble free radical initiator to form a seed;

(2) sequentially adding at least six equal increments of a monomer mixture of styrene, butadiene and from about 6 to less than 10 wt % acrylic acid to the seed under emulsion polymerization conditions to form a styrene-butadiene-acrylic acid copolymer; and then (3) neutralizing the styrene-butadiene-acrylic acid copolymer to a pH of about 4.5 to 7 to form the latex.

2. The latex of claim 1 wherein the monomer mixture in step (2) includes about 34–70 wt % styrene.

3. The latex of claim 1 wherein the monomer mixture in step (2) also includes about 0.5–2.5 wt % itaconic acid, about 20–55 wt % butadiene and about 6–10 wt % acrylic acid.

4. The latex of claim 3 wherein the monomer mixture in step (2) includes 8 wt % acrylic acid.

5. The latex of claim 3 wherein the said monomer mixture includes 2 wt % itaconic acid.

6. The latex of claim 1 wherein the seed monomer mixture includes about 0.05–2.0 wt % surfactant.

7. The latex of claim 1 wherein the copolymer is neutralized by addition of a base selected from potassium hydroxide, sodium bicarbonate, and ammonium hydroxide, sodium hydroxide.

* * * * *